United States Patent
David et al.

(10) Patent No.: US 8,516,983 B2
(45) Date of Patent: Aug. 27, 2013

(54) HARMONIC DRIVE CAMSHAFT PHASER WITH A HARMONIC DRIVE RING TO PREVENT BALL CAGE DEFLECTION

(75) Inventors: Pascal David, Beidweiler (LU); Pierre Kimus, Attert (BE)

(73) Assignee: Delphi Technologies, Inc., Troy, MI (US)

( * ) Notice: Subject to any disclaimer, the term of this patent is extended or adjusted under 35 U.S.C. 154(b) by 160 days.

(21) Appl. No.: 13/249,286

(22) Filed: Sep. 30, 2011

(65) Prior Publication Data
US 2013/0081587 A1 Apr. 4, 2013

(51) Int. Cl.
F01L 1/34 (2006.01)

(52) U.S. Cl.
USPC ..................... 123/90.17; 123/90.15

(58) Field of Classification Search
USPC ................. 123/90.15, 90.17, 90.31
See application file for complete search history.

(56) References Cited

U.S. PATENT DOCUMENTS

| | | | |
|---|---|---|---|
| 2,038,010 A | 4/1936 | Smith | |
| 3,285,099 A | 11/1966 | Parks, Jr. et al. | |
| 4,451,098 A | 5/1984 | Farley et al. | |
| 4,715,247 A | 12/1987 | Honda et al. | |
| 5,417,186 A | 5/1995 | Elrod et al. | |
| 5,937,710 A | 8/1999 | Gould et al. | |
| 6,257,186 B1 | 7/2001 | Heer | |
| 6,302,073 B1 * | 10/2001 | Heer | 123/90.17 |
| 6,328,006 B1 | 12/2001 | Heer | |
| 7,421,990 B2 | 9/2008 | Taye et al. | |
| 2011/0030631 A1 | 2/2011 | David et al. | |
| 2011/0030632 A1 | 2/2011 | David et al. | |

FOREIGN PATENT DOCUMENTS

| | | |
|---|---|---|
| DE | 102008053913 A1 | 5/2010 |
| EP | 2282021 A1 | 2/2011 |
| GB | 2168766 A | 6/1986 |
| JP | 2009008170 | 1/2009 |
| WO | 2009013074 | 1/2009 |

OTHER PUBLICATIONS

European Search Report, Jan. 29, 2013.
U.S. Appl. No. 12/965,057.
U.S. Appl. No. 12/825,806.
U.S. Appl. No. 12/844,918.
U.S. Appl. No. 13/112,199.
U.S. Appl. No. 13/102,138.
U.S. Appl. No. 13/155,685.
U.S. Appl. No. 13/184,975.

* cited by examiner

*Primary Examiner* — Zelalem Eshete
(74) *Attorney, Agent, or Firm* — Thoma N. Twomey (57) ABSTRACT

A camshaft phaser includes a housing. A harmonic gear drive unit is disposed within the housing and includes a circular spline and a dynamic spline, a flexspline disposed within the circular spline and the dynamic spline, a wave generator disposed within the flexspline, and a rotational actuator connectable to the wave generator. A wave generator bearing includes an inner race with an inner race axial end, an outer race, a plurality of balls between the inner and outer races, and a ball cage. The ball cage includes an annular section disposed axial from the balls proximal to the inner race axial end and a plurality of ball separators such that consecutive balls are separated by one of the ball separators. A rigid support ring extends axially beyond the inner race axial end toward the annular section to limit axial distortion of the annular section.

7 Claims, 7 Drawing Sheets

HARMONIC DRIVE CAMSHAFT PHASER WITH A HARMONIC DRIVE RING TO PREVENT BALL CAGE DEFLECTION

TECHNICAL FIELD OF INVENTION

The present invention relates to an electric variable camshaft phaser (eVCP) which uses an electric motor and a harmonic gear drive unit to vary the phase relationship between a crankshaft and a camshaft in an internal combustion engine; more particularly, to an eVCP with a support ring to prevent deflection of a ball cage of the harmonic gear drive unit, and more particularly to such a support ring which extends axially into an inner race of the harmonic gear drive unit.

BACKGROUND OF INVENTION

Camshaft phasers for varying the timing of combustion valves in internal combustion engines are well known. A first element, known generally as a sprocket element, is driven by a chain, belt, or gearing from an engine's crankshaft. A second element, known generally as a camshaft plate, is mounted to the end of the engine's camshaft. A common type of camshaft phaser used by motor vehicle manufactures is known as a vane-type camshaft phaser. U.S. Pat. No. 7,421,989 shows a typical vane-type camshaft phaser which generally comprises a plurality of outwardly-extending vanes on a rotor interspersed with a plurality of inwardly-extending lobes on a stator, forming alternating advance and retard chambers between the vanes and lobes. Engine oil is supplied via a multiport oil control valve, in accordance with an engine control module, to either the advance or retard chambers, to change the angular position of the rotor relative to the stator, as required to meet current or anticipated engine operating conditions.

While vane-type camshaft phasers are effective and relatively inexpensive, they do suffer from drawbacks. First, at low engine speeds, oil pressure tends to be low, and sometimes unacceptable. Therefore, the response of a vane-type camshaft phaser may be slow at low engine speeds. Second, at low environmental temperatures, and especially at engine start-up, engine oil displays a relatively high viscosity and is more difficult to pump, therefore making it more difficult to quickly supply engine oil to the vane-type camshaft phaser. Third, using engine oil to drive the vane-type camshaft phaser is parasitic on the engine oil system and can lead to requirement of a larger oil pump. Fourth, for fast actuation, a larger engine oil pump may be necessary, resulting in additional fuel consumption by the engine. Lastly, the total amount of phase authority provided by vane-type camshaft phasers is limited by the amount of space between adjacent vanes and lobes. A greater amount of phase authority may be desired than is capable of being provided between adjacent vanes and lobes. For at least these reasons, the automotive industry is developing electrically driven camshaft phasers.

Figure 1:
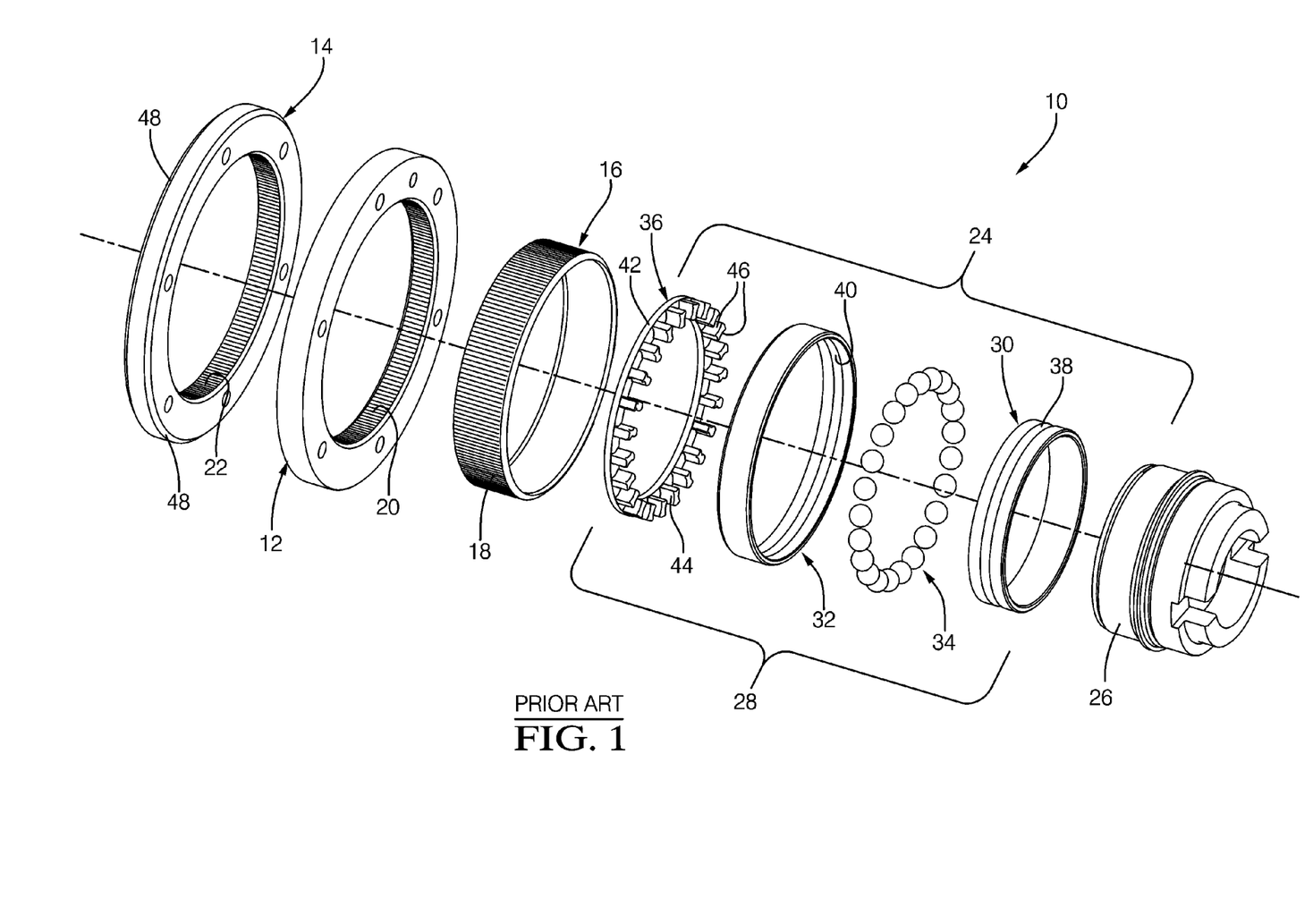
FIG. 1 is an exploded isometric view of a prior art harmonic gear drive unit.
Figure 2:
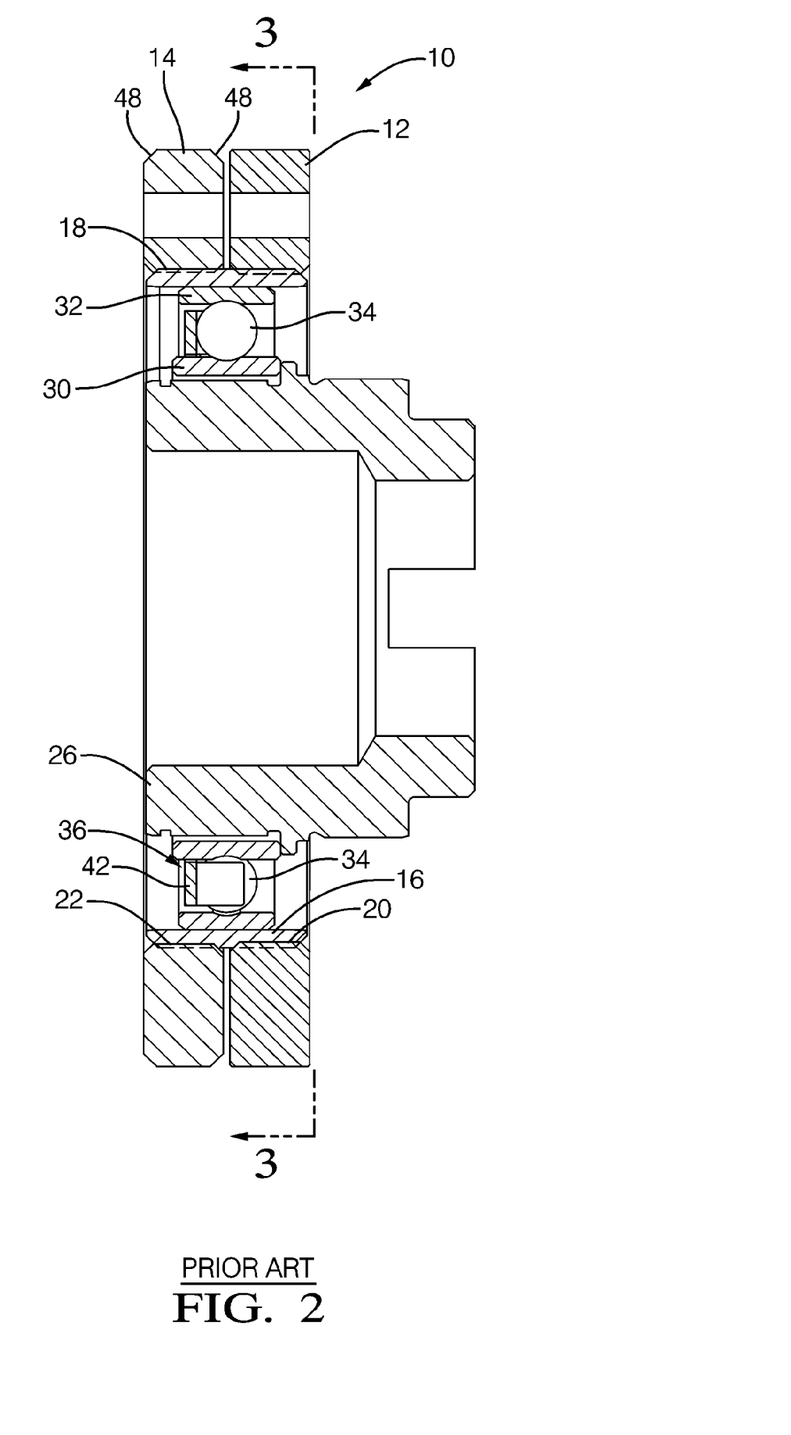
FIG. 2 is an axial cross section of a prior art harmonic gear drive unit.

Harmonic gear drive units for angular positioning are also well known. Referring to FIGS. 1-2, a typical flat plate harmonic gear drive unit is shown as harmonic gear drive unit 10. Harmonic gear drive unit 10 comprises outer first spline 12 which may be either a circular spline or a dynamic spline (hereinafter referred to as circular spline 12) as described below; outer second spline 14 (hereinafter referred to as dynamic spline 14) which is the opposite (dynamic or circular) of circular spline 12 and is coaxially positioned adjacent circular spline 12; flexspline 16 disposed radially inwards of both circular spline 12 and dynamic spline 14 and having outwardly-extending flexspline teeth 18 for engaging inwardly-extending circular spline teeth 20 of circular spline 12 and also for engaging inwardly-extending dynamic spline teeth 22 of dynamic spline 14; and wave generator assembly 24 disposed radially inwards of and engaging flexspline 16.

Wave generator assembly 24 includes an elliptical shaped wave generator 26 with wave generator bearing 28 fitted tightly over wave generator 26 to conform to the elliptically shaped circumference of wave generator 26. Wave generator bearing 28 includes inner race 30, outer race 32, a plurality of balls 34, and ball cage 36. Inner race 30 is disposed immediately radially outward of wave generator 26. Outer race 32 is disposed radially outward of inner race 30 with the plurality of balls 34 disposed radially between inner race 30 and outer race 32. Balls 34 ride within inner race groove 38 formed in the outer circumference of inner race 30. Balls 34 also ride within outer race groove 40 formed in the inner circumference of outer race 32. Ball cage 36 includes annular section 42 from which a plurality of ball separators 44 extend axially such that adjacent balls 34 are separated by one of the plurality of ball separators 44. Ball separators 44 include arcuate surfaces 46 which are concave and face toward an adjacent ball separator 44 to follow the contour of balls 34. Arcuate surfaces 46 are concave such that the radius of each arcuate surface 46 is in a plane substantially parallel to annular section 42.

Flexspline 16 is a non-rigid ring which is fitted tightly over and elastically deflected by wave generator assembly 24. Flexspline teeth 18 have a slightly smaller pitch diameter than circular spline teeth 20.

Circular spline 12 is a rigid ring with circular spline teeth 20 engaging flexspline teeth 18. Circular spline 12 has slightly fewer circular spline teeth 20 than flex spline 16 has flexspline teeth 18. Circular spline 12 serves as the input member.

Dynamic spline 14 is a rigid ring with dynamic spline teeth 22 engaging flexspline teeth 18. Dynamic spline 14 has the same number of dynamic spline teeth 22 as flexspline 16 has flexspline teeth 18. Dynamic spline 14 rotates together with flexspline 16 in a one-to-one relationship and serves as the output member. Of course, the circular spline may have more teeth than the dynamic spline, in which case the rotational relationship is then reversed.

Dynamic spline 14 may be distinguished from circular spline 12 by chamfered corners 48 at its outside diameter. Chamfered corners 48 provide for visual distinction of circular spline 12 and dynamic spline 14 which may otherwise differ visually only by the number of circular spline teeth 20 and dynamic spline teeth 22 which may be difficult to visually discern. Alternatively, but not shown, dynamic spline 14 may not include chamfered corners 48, but rather circular spline 12 may included chamfered corners at its outside diameter.

Figure 3:
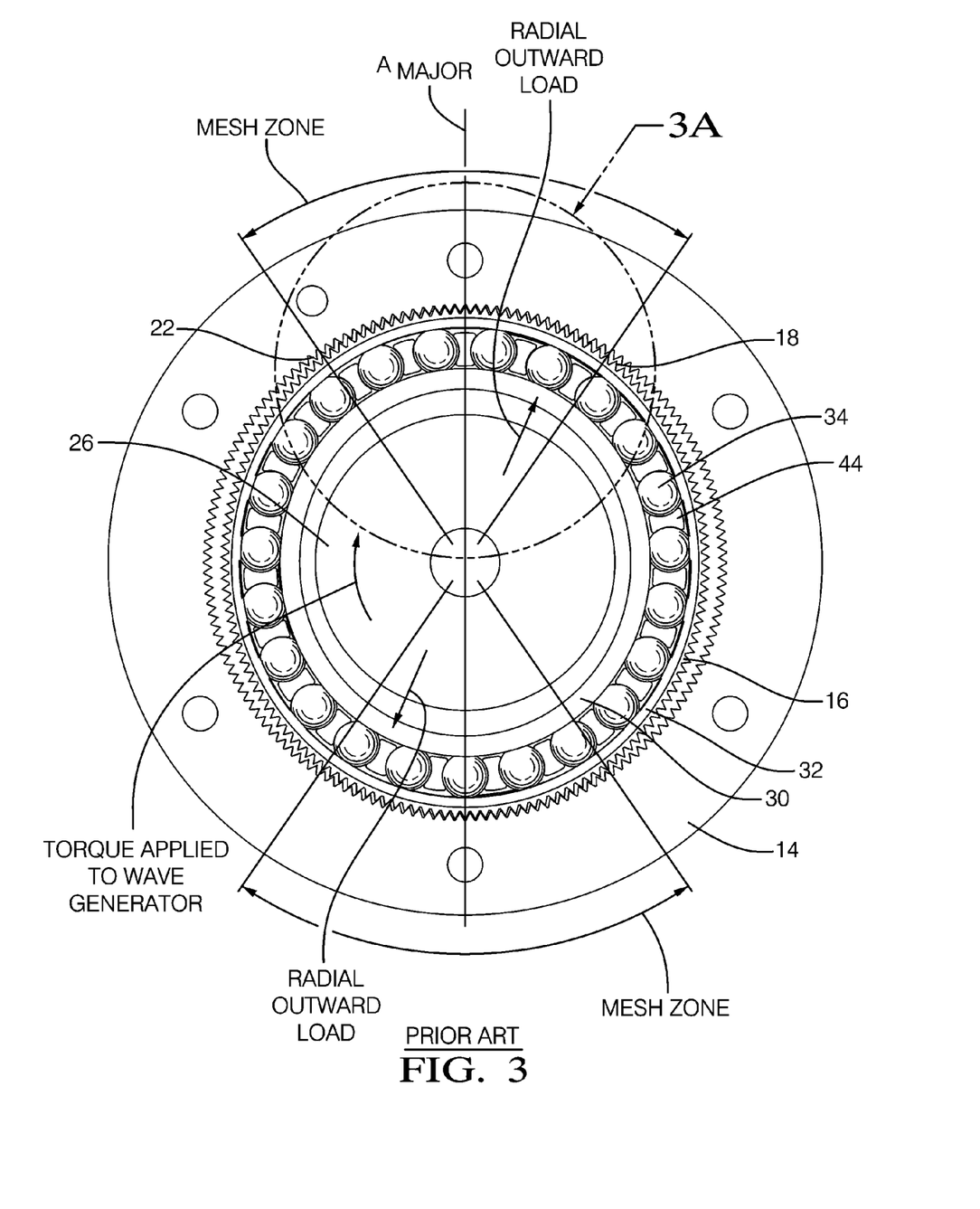
FIG. 3 is a radial cross section of the harmonic gear drive unit of FIG. 2 taken through section line 3-3.
Figure 3A:
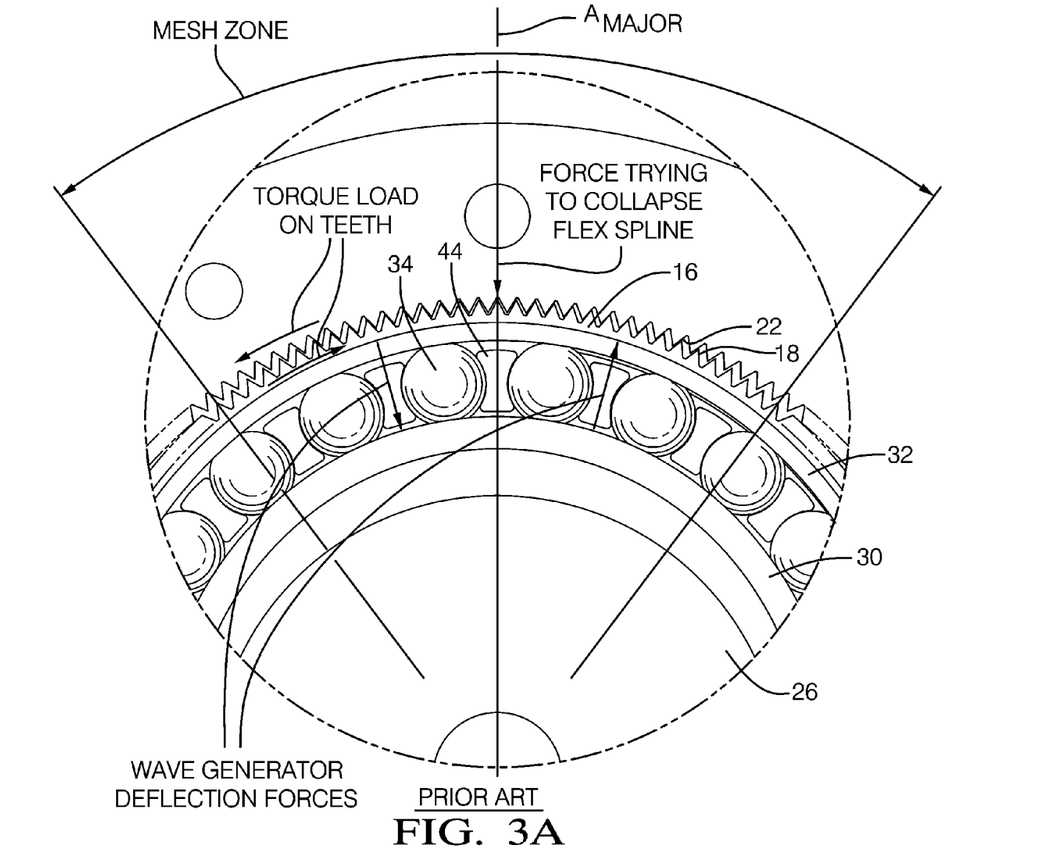
FIG. 3A is an enlarged view of a portion of FIG. 3.

Now referring to FIGS. 1, 2, 3, 3A, and 4, the elliptical shape of wave generator assembly 24 causes flexspline teeth 18 to engage both circular spline teeth 20 and dynamic spline teeth 22 along and near major elliptical axis $A_{major}$ in two mesh zones 180° apart and symmetrical to major elliptical axis $A_{major}$ as shown in FIGS. 3 and 3A. When wave generator 26 is rotated relative to circular spline 12 and dynamic spline 14, a rotation wave is generated in flexspline 16 (actually two waves 180° apart, corresponding to opposite ends of the major ellipse axis $A_{major}$). Since dynamic spline 14 has the same number of dynamic spline teeth 22 as flexspline 16 has flexspline teeth 18, there is no relative rotation of flexspline 16 with dynamic spline 14. However, since circular spline 12 has slightly fewer circular spline teeth 20 than flexspline 16 has flexspline teeth 18, flexspline 16 rotates relative to circular spline 12. As a result, circular spline 12 rotates past the dynamic spline 14 during rotation of wave generator 26 relative to dynamic spline 14, defining a gear ratio therebetween (for example, a gear ratio of 50:1 would mean that 1 rotation of circular spline 12 past dynamic spline 14 corresponds to 50 rotations of wave generator 26 relative to dynamic spline 14). Harmonic gear drive unit 10 is thus a high-ratio gear transmission; that is, the angular phase relationship between circular spline 12 and dynamic spline 14 changes by 2% for every revolution of wave generator 26.

One type of electrically driven camshaft phaser being developed is shown in U.S. patent application Ser. Nos. 12/536,575; 12/844,918; 12/825,806; 12/848,599;12/965,057; 13/102138;13/112,199; 13/155,685; and U.S. patent application Ser. No. 13/184,975 which are commonly owned by Applicant and incorporated herein by reference in their entirety. This electrically driven camshaft phaser utilizes a harmonic gear drive unit to change the phase relationship between the crankshaft and a camshaft of the internal combustion engine. This is accomplished by connecting the crankshaft to the circular spline of the harmonic gear drive unit in a fixed ratio of rotation and by connecting the camshaft to the dynamic spline of the harmonic gear drive unit in a fixed ratio or rotation. In this way, when the wave generator of the harmonic gear drive unit of the wave generator is rotated relative to the circular spline and dynamic spline, relative rotation between the circular spline and dynamic spline is generated, thereby resulting in a change of phase relationship between the crankshaft and the camshaft.

Typical angular positioning applications of harmonic gear drive units are not constrained to limit the angular positioning range. However, when a harmonic gear drive unit is used in a camshaft phaser to change the phase relationship between the crankshaft and the camshaft, stop members may be employed to limit the phase authority in order to prevent over-advancing and over-retarding which may, for example, result in undesired engine operation and engine damage due to interference of the engine valves and pistons. An example of such stop members is shown in U.S. patent application Ser. No. 12/844,918. Testing has shown that if the stop members are engaged with a sufficient torque applied to the wave generator assembly, the splines of the harmonic gear drive unit may be damaged by wind-up of the flex spline.

Figure 4:
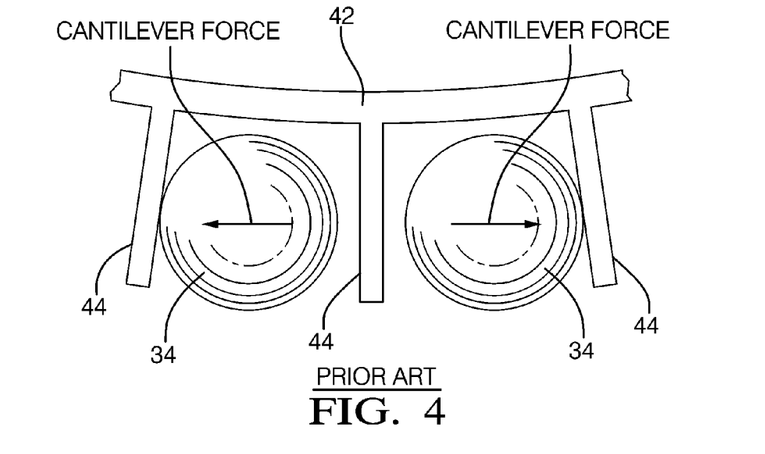
FIG. 4 is a pair of adjacent balls in a ball cage of the harmonic gear drive unit of FIG. 1.

Referring now to FIGS. 3, 3A, and 4 in which circular spline 12 is not visible and which represents a condition when the stop members (not shown) are engaged, circular spline 12 and the dynamic spline 14 of harmonic gear drive unit 10 are effectively locked relative to each other. Flexspline teeth 18, as always, maintain the two mesh zones with circular spline teeth 20 and dynamic spline teeth 22 symmetrical about major elliptical axis $A_{major}$. As torque is continued to be applied to wave generator 26, flexspline 16 wants to continue driving circular spline 12 and the dynamic spline 14 in opposite directions, but cannot because circular spline 12 and the dynamic spline 14 are locked and therefore flexspline 16 is also rotationally locked. The torque on wave generator 26 is resolved into both a torque load through flexspline teeth 18, circular spline teeth 20, and dynamic spline teeth 22 in the two zones of mesh and also in a radial outward load where wave generator 26 is trying to deflect flexspline 16 radially outward where flexspline teeth 18 do not mesh with circular spline teeth 20 and the dynamic spline teeth 22. The torque load between flexspline teeth 18 engaged with circular spline teeth 20 and the dynamic spline teeth 22 resolves into a tangential force vector and a radial force vector, the radial force vector acting to push flexspline 16 away from circular spline teeth 20 and dynamic spline teeth 22 radially. This radial force tries to collapse flexspline 16 in the mesh zone. These two forces acting on flexspline 16 try to collapse flexspline 16 inward at the center of the mesh zone (at $A_{major}$). Inward collapse of flexspline 16 is resisted by balls 34. If one of the balls 34 was perfectly in the center of the mesh zone, flexspline 16 would not be able to deflect. However, the natural orientation of balls 34 is to have one equal distance on each side of the center of the mesh zone. These forces are illustrated in FIGS. 3 and 3A. Under this condition, there are tangential force vectors which act to push each ball 34 adjacent each side of the center of the mesh zone apart as shown in FIG. 4 which shows annular section being deformed in an arched shape from its normally straight shape. Ball separators 44 prevent balls 34 from moving a significant amount, however, balls 34 apply a cantilever load on ball separators 44, causing ball cage 36 to move axially. Axial misalignment of balls 34 as a result of these conditions may increase the cantilever load on ball separators 44. As ball cage 36 moves axially, the cantilever load on ball separators 44 increases, causing annular section 42 to deform. It is this deformation of annular section 42 that allows wind-up of flexspline 16. This wind-up may lead to durability and operational issues of harmonic gear drive unit 10.

U.S. Pat. No. 3,285,099 shows an example of a wave generator bearing for a harmonic gear drive unit. In this example, a portion of the wave generator extends radially outward. When the inner race is placed on the wave generator, an inner race axial end of the inner race is positioned against the portion of the wave generator that extends radially outward. An annular section of a ball cage is placed proximal to and axially inward of the inner race axial end, defining an axial space between the annular section and the portion of the wage generator extending radially outward. Since the portion of the wave generator that extends radially outward is flush with the inner race axial end, it may not provide sufficient axial support to the ball cage.

What is needed is an eVCP which minimizes deformation of a ball cage of a harmonic gear drive unit and which minimizes wind-up of a flexspline of a harmonic gear drive unit.

SUMMARY OF THE INVENTION

Briefly described, a camshaft phaser for controllably varying the phase relationship between a crankshaft and a camshaft in an internal combustion engine is provided. The camshaft phaser includes a housing having a longitudinal axis with a harmonic gear drive unit disposed therewithin. The harmonic gear drive unit includes a circular spline and an axially adjacent dynamic spline, a flexspline disposed within the circular spline and the dynamic spline, a wave generator assembly disposed within the flexspline, and a rotational actuator connectable to the wave generator assembly such that rotation of the wave generator assembly causes relative rotation between the circular spline and the dynamic spline. The wave generator assembly includes an elliptical wave generator surrounded tightly with an inner race having an inner race axial end, an outer race surrounded tightly with the flexspline, a plurality of balls disposed between the inner race and the outer race, and a ball cage having an annular section disposed axial from the balls proximal to the inner race axial end and a plurality of ball separators extending axially from the annular section such that consecutive balls are separated by one of the ball separators. One of the circular spline and the dynamic spline is fixed to the housing in order to prevent relative rotation therebetween. A hub is rotatably disposed within the housing axially adjacent to the harmonic gear drive unit and attachable to the camshaft and fixed to the other of the circular spline and the dynamic spline in order to prevent relative rotation therebetween. A rigid support ring is fixed axially with the housing and extends axially beyond the inner race axial end toward the annular section to limit axial distortion of the annular section.

BRIEF DESCRIPTION OF DRAWINGS

This invention will be further described with reference to the accompanying drawings in which.

DETAILED DESCRIPTION OF INVENTION

Figure 5:
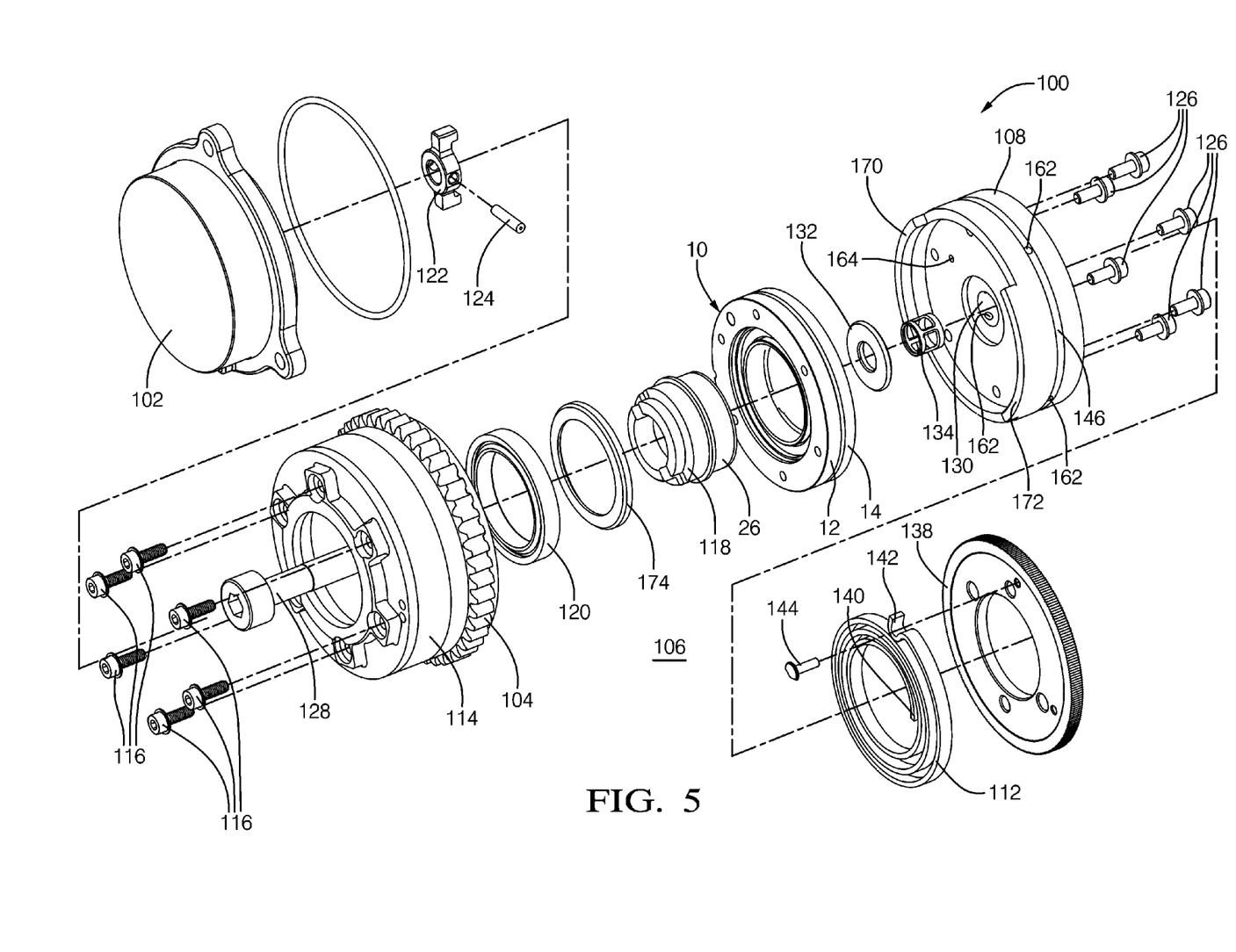
FIG. 5 is an exploded isometric view of an eVCP in accordance with the present invention.
Figure 6:
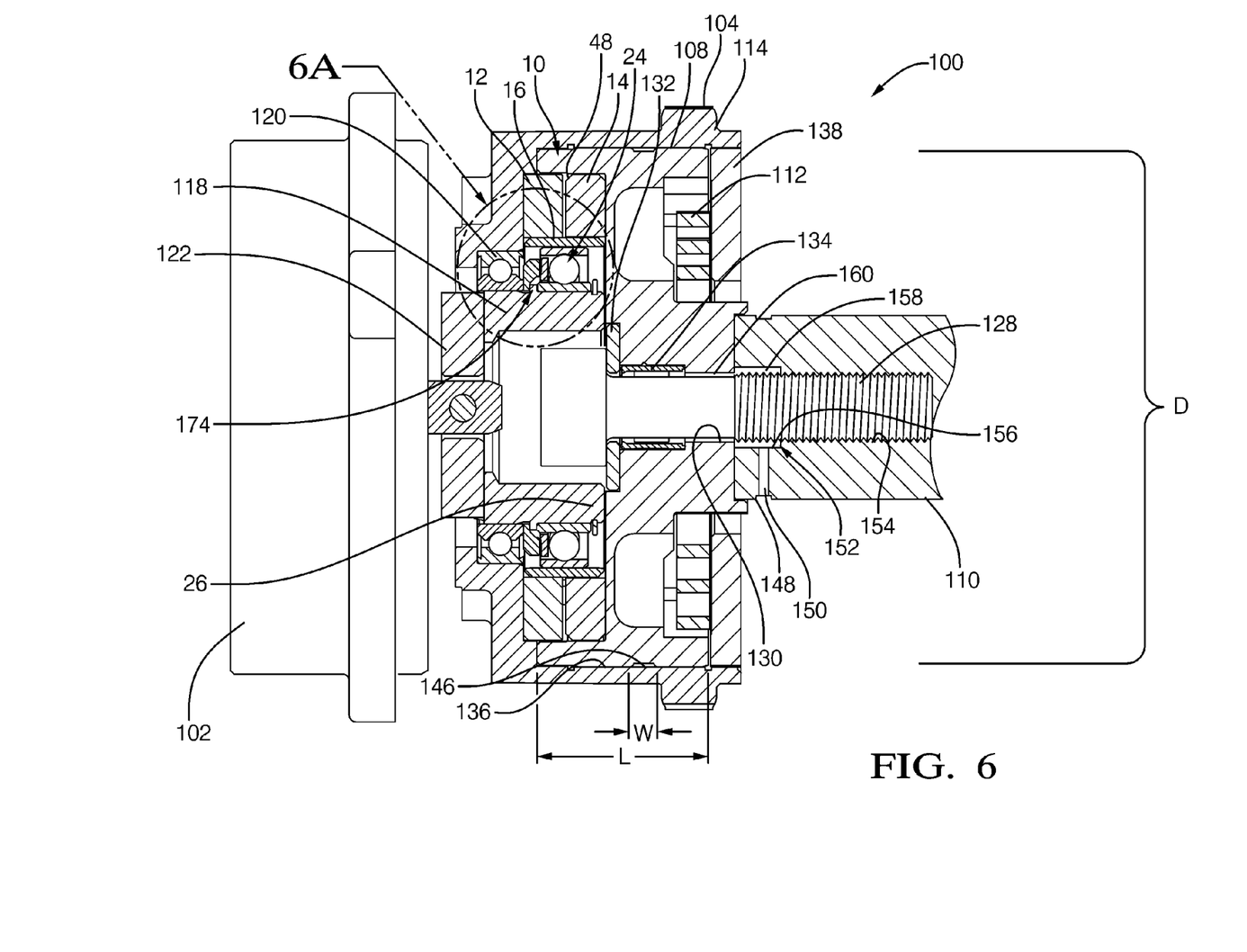
FIG. 6 is an axial cross-section of an eVCP in accordance with the present invention.

Referring to FIGS. 5 and 6, eVCP 100 in accordance with the present invention comprises flat harmonic gear drive unit 10; rotational actuator 102 that may be a hydraulic motor but is preferably a DC electric motor, operationally connected to harmonic gear drive unit 10; input sprocket 104 operationally connected to harmonic gear drive unit 10 and drivable in a fixed ratio by a crankshaft (not shown) of internal combustion engine 106; output hub 108 attached to harmonic gear drive unit 10 and mountable to an end of internal combustion engine camshaft 110; and bias spring 112 operationally disposed between output hub 108 and input sprocket 104. Electric motor 102 may be an axial-flux DC motor. Harmonic gear drive unit 10 includes the same elements and operates in the same way as described earlier.

Still referring to FIGS. 5 and 6, input sprocket 104 is rotationally fixed to a generally cup-shaped sprocket housing 114 that is fastened by bolts 116 to circular spline 12. Coupling adaptor 118 is mounted to wave generator 26 and extends through sprocket housing 114, being supported by bearing 120 mounted in sprocket housing 114. While coupling adapter 118 is shown to be made of unitary construction with wave generator 26, it should be understand that coupling adapter 118 may be made separately and joined to wave generator 26 by known joining methods. Coupling 122 mounted to the motor shaft of electric motor 102 and pinned thereto by pin 124 engages coupling adaptor 118, permitting wave generator 26 to be rotationally driven by electric motor 102, as may be desired to alter the phase relationship between circular spline 12 and dynamic spline 14.

Output hub 108 is fastened to dynamic spline 14 by bolts 126 and may be secured to camshaft 110 by camshaft phaser attachment bolt 128 extending through output hub axial bore 130 in output hub 108, and capturing washer 132 and filter 134 recessed in output hub 108.

In an eVCP, it is necessary to limit radial run-out between the input hub and output hub. Referring to FIG. 6, radial run-out is limited by a single journal bearing interface defining journal bearing 136 between sprocket housing 114 (input hub) and output hub 108, thereby reducing the overall axial length of eVCP 100 and its cost to manufacture.

Backplate 138 is press fit within sprocket housing 114 in order to retain output hub 108 within sprocket housing 114. Backplate 138 may also be retained by a retaining ring (not shown) fitted in a groove (also not shown) formed in the inner circumference of sprocket housing 114). Backplate 138 also captures bias spring 112 against output hub 108. Inner spring tang 140 of bias spring 112 is engaged by output hub 108, and outer spring tang 142 of bias spring 112 is attached to backplate 138 by pin 144. In the event of an electric motor malfunction, bias spring 112 is biased to back-drive harmonic gear drive unit 10 without help from electric motor 102 to a rotational position of dynamic spline 14 wherein internal combustion engine 106 will start or run, which position may be at one of the extreme ends of the range of authority or intermediate of the camshaft phaser's extreme ends of its rotational range of authority. For example, the rotational range of travel in which bias spring 112 biases harmonic gear drive unit 10 may be limited to something short of the end stop position of the phaser's range of authority. Such an arrangement would be useful for internal combustion engines requiring an intermediate park position for idle or restart.

The nominal diameter of output hub 108 is D; the nominal axial length of journal bearing 136 is L; and the nominal axial length of oil groove 146 formed in either output hub 108 (shown) and/or in sprocket housing 114 (not shown) for supplying oil to journal bearing 136 is W. In addition to journal bearing clearance, the length L of journal bearing 136 in relation to output hub diameter D controls how much output hub 108 can tip within sprocket housing 114. The width of oil groove 146 in relation to journal bearing length L controls how much bearing contact area is available to carry the radial load. Experimentation has shown that a currently preferred range of the ratio L/D may be between about 0.25 and about 0.40, and that a currently preferred range of the ratio W/L may be between about 0.15 and about 0.70.

In order to lubricate various elements of eVCP 100, oil is provided thereto from internal combustion engine 106 through annular camshaft oil groove 148 supplied with oil by an oil gallery (not shown) of a camshaft bearing (also not shown). Annular camshaft oil groove 148 provides oil to camshaft oil passage 150 which extends radially through camshaft 110 from annular camshaft oil groove 148 to camshaft bore 152 of camshaft 110. Camshaft bore 152 includes small diameter portion 154 which threadably engages camshaft phaser attachment bolt 128. Camshaft bore 152 also includes large diameter portion 156 which defines camshaft annular space 158 with camshaft phaser attachment bolt 128 that is adjacent to output hub 108. Camshaft annular space 158 receives the oil from camshaft oil passage 150. Camshaft annular space 158 is in fluid communication with output hub annular space 160 which is defined between output hub axial bore 130 and camshaft phaser attachment bolt 128. From output hub annular space 160, the oil passes through filter 134 to prevent contaminants from passing further into eVCP 100. Filter 134 is a band-type filter that may be a screen or mesh and may be made from any number of different materials that are known in the art of oil filtering. After passing through filter 134, the oil is communicated to journal bearing oil passages 162 which extend radially through output hub 108 from output hub axial bore 130 to oil groove 146 for lubricating journal bearing 136.

Oil may also be used to lubricate harmonic gear drive unit 10 and bearing 120. In order to supply oil thereto, harmonic drive oil passage 164 is provided axially through output hub 108 beginning at one of the journal bearing oil passages 162 and extending toward harmonic gear drive unit 10 substantially parallel to the axis of rotation of eVCP 100. In this way, oil from journal bearing oil passage 162 is communicated to harmonic gear drive unit 10 and bearing 120.

Figure 7:
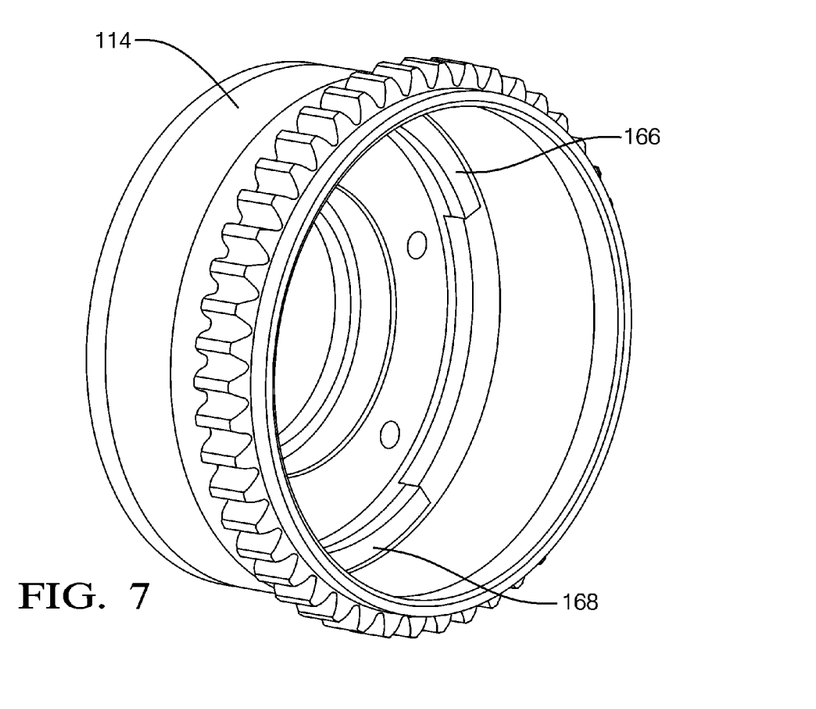
FIG. 7 is an isometric view of a sprocket housing of FIG. 5.

Now referring to FIGS. 5 and 7, eVCP 100 is provided with a means for limiting the phase authority of eVCP 100. Sprocket housing 114 is provided with first and second arcuate input stop members 166, 168 which extend axially away from the bottom of sprocket housing 114. Output hub 108 includes corresponding features which interact with first and second arcuate input stop members 166, 168 to limit the phase authority of eVCP 100. Output hub 108 is provided with first and second arcuate output stop members 170, 172 which extend axially away from the surface of output hub 108 facing toward the bottom of sprocket housing 114 and which fit between first and second arcuate input stop members 166, 168 with clearance equal to the phase authority of eVCP 100. First and second arcuate input stop members 166, 168 are brought into contact with first and second arcuate output stop members 170, 172 respectively when eVCP 100 is positioned in one of a maximum advance position and a maximum retard position. Similarly, first and second arcuate input stop members 166, 168 are brought into contact with second and first arcuate output stop members 172, 170 respectively when eVCP 100 is positioned in the other of the maximum advance position and the maximum retard position. In this way, the phase authority of eVCP 100 is mechanically limited.

Figure 6A:
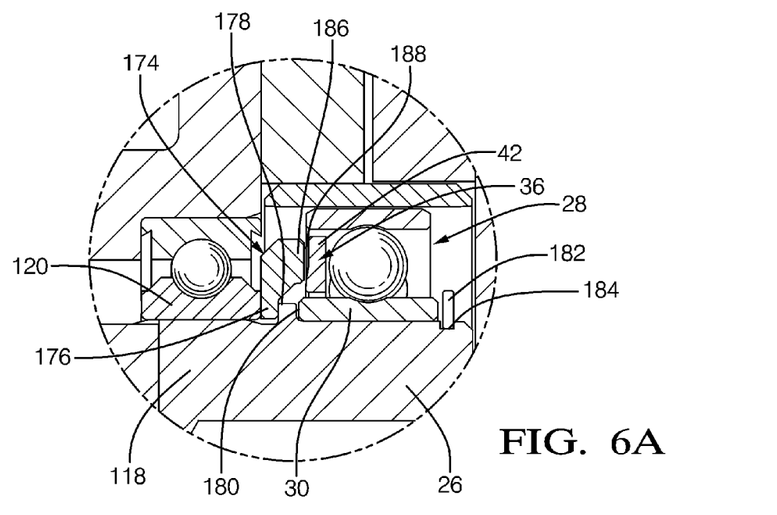
FIG. 6A is an enlarged view of circle 6A of FIG. 6.

In order to minimize the undesired wind-up of flexspline 16 resulting from distortion of annular section 42 of ball cage 36 and referring to FIGS. 5, 6, and 6A, eVCP 100 is provided with support ring 174 which radially surrounds coupling 118. Support ring 174 is a rigid ring which includes retention portion 176 which is captured between coupling adapter flange 178 and bearing 120. Coupling adapter flange 178 extends radially outward from coupling adapter 118 to axially position wave generator bearing 28 on wave generator 26 and to axially position bearing 120 on coupling adapter 118. Wave generator bearing 28 is positioned on wave generator 26 such that inner race axial end 180 of inner race 30 is closely axially adjacent coupling adapter flange 178. Wave generator bearing 28 is retained on wave generator 26 by retaining ring 182 which fits within retaining ring groove 184 formed in wave generator 26. Wave generator bearing 28 is oriented on wave generator 26 such that annular section 42 is facing toward bearing 120. Bearing 120 is positioned on coupling adapter 118 by press fit until retention portion 176 is tightly captured between coupling adapter flange 178 and bearing 120.

Support ring 174 also includes backup portion 186 which extends axially away from retention portion 176 toward wave generator bearing 28. Backup portion 186 extends axially beyond inner race axial end 180 toward annular section 42. Axial space 188 is preferably defined between backup portion 186 and annular section 42 to prevent friction between backup portion 186 and annular section 42. The rigid nature of support ring 174 and the close proximity of backup portion 186 to annular section 42 by extending axially beyond inner race axial end 180 toward annular section 42 provides support to annular section 42 when eVCP 100 has reached maximum phase authority in either the advance direction of phasing or the retard direction of phasing. This support of annular section 42 helps to keep ball cage 36 positioned axially correctly to minimize deflection of ball separators 44, provides additional stiffness to annular section 42, and minimizes axial misalignment of balls 34 which reduces cantilever forces on ball separators 44 which mitigate the wind-up effect on flexspline 16.

The embodiment described herein describes harmonic gear drive unit 10 as comprising circular spline 12 which serves as the input member; dynamic spline 14 which serves as the output member and is coaxially positioned adjacent circular spline 12; flexspline 16 disposed radially inwards of both circular spline 12 and dynamic spline 14 and having outwardly-extending flexspline teeth 18 for engaging inwardly-extending circular spline teeth 20 and dynamic spline teeth 22; and wave generator assembly 24 disposed radially inwards of and engaging flexspline 16. As described, harmonic gear drive unit 10 is a flat plate or pancake type harmonic gear drive unit as referred to in the art. However, it should now be understood that other types of harmonic gear drive units may be used in accordance with the present invention. For example, a cup type harmonic gear drive unit may be used. The cup type harmonic gear drive unit comprises a circular spline which serves as the input member; a flexspline which serves as the output member and which is disposed radially inwards of the circular spline and having outwardly-extending gear teeth disposed for engaging inwardly-extending gear teeth on the circular spline; and a wave generator disposed radially inwards of and engaging the flexspline.

While this invention has been described in terms of preferred embodiments thereof, it is not intended to be so limited, but rather only to the extent set forth in the claims that follow.

We claim:

1. A camshaft phaser for controllably varying the phase relationship between a crankshaft and a camshaft in an internal combustion engine, said camshaft phaser comprising:
    a housing having a longitudinal axis;
    a harmonic gear drive unit disposed within said housing, said harmonic gear drive unit comprising a circular spline and an axially adjacent dynamic spline, a flexspline disposed within said circular spline and said dynamic spline, a wave generator assembly disposed within said flexspline, and a rotational actuator connectable to said wave generator assembly such that rotation of said wave generator assembly causes relative rotation between said circular spline and said dynamic spline, wherein said wave generator assembly includes an elliptical wave generator surrounded tightly with an inner race having an inner race axial end, an outer race surrounded tightly with said flexspline, a plurality of balls disposed between said inner race and said outer race, and a ball cage having an annular section disposed axial from said balls proximal to said inner race axial end and a plurality of ball separators extending axially from said annular section such that consecutive balls are separated by one of said ball separators, wherein one of said circular spline and said dynamic spline is fixed to said housing in order to prevent relative rotation therebetween;
    a hub rotatably disposed within said housing axially adjacent to said harmonic gear drive unit and attachable to said camshaft and fixed to the other of said circular spline and said dynamic spline in order to prevent relative rotation therebetween; and
    a rigid support ring fixed axially and extending axially beyond said inner race axial end toward said annular section to limit axial deflection of said annular section.

2. A camshaft phaser as in claim 1 further comprising:
    a coupling adapter mounted to said wave generator and attachable to said rotational actuator, said coupling adapter including a coupling adapter flange extending radially outward therefrom; and
    a bearing radially surrounding said coupling adapter;
    wherein a retention portion of said support ring is axially captured between said coupling adapter flange and said bearing.

3. A camshaft phaser as in claim 2 wherein said support ring includes a backup portion extending axially from said retention portion axially beyond said inner race axial end toward said annular section.

4. A camshaft phaser as in claim 3 wherein an axial space is defined between said backup portion and said annular section.

5. A camshaft phaser as in claim 1 further comprising stop members for limiting phase authority of said camshaft phaser.

6. A camshaft phaser for controllably varying the phase relationship between a crankshaft and a camshaft in an internal combustion engine, said camshaft phaser comprising:

a harmonic gear drive unit including an input member, an output member, a wave generator assembly disposed within said input member and said output member, and a rotational actuator connected to said wave generator such that rotation of said wave generator causes relative rotation between said input member and said output member, wherein said wave generator assembly includes an elliptical wave generator surrounded tightly with an inner race having an inner race axial end, an outer race, a plurality of balls disposed between said inner race and said outer race, and a ball cage having an annular section disposed axial from said balls proximal to said inner race axial end and a plurality of ball separators extending axially from said annular section such that consecutive balls are separated by one of said ball separators; and a rigid support ring fixed axially and extending axially beyond said inner race axial end toward said annular section to limit axial deflection of said annular section.

7. A camshaft phaser as in claim 6 further comprising stop members for limiting phase authority of said camshaft phaser.

* * * * *